March 9, 1943.   H. G. BUSIGNIES ET AL   2,313,047
DIRECTION FINDING SYSTEM
Filed Aug. 1, 1941
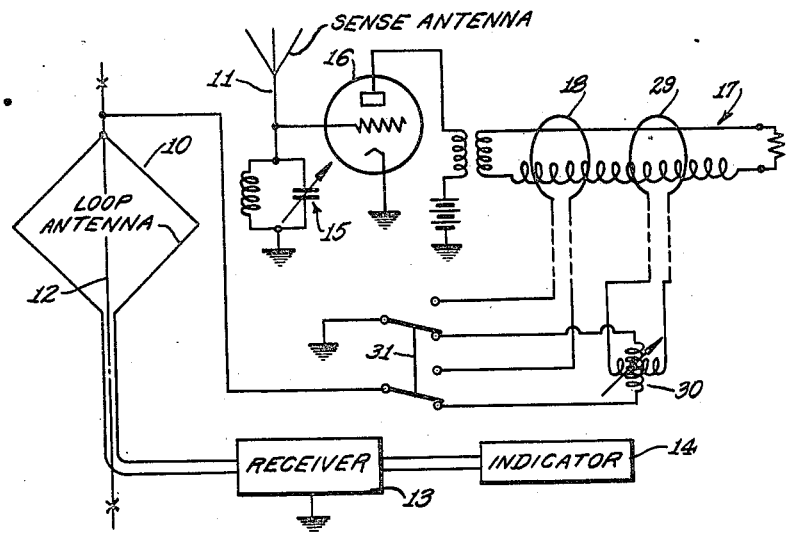
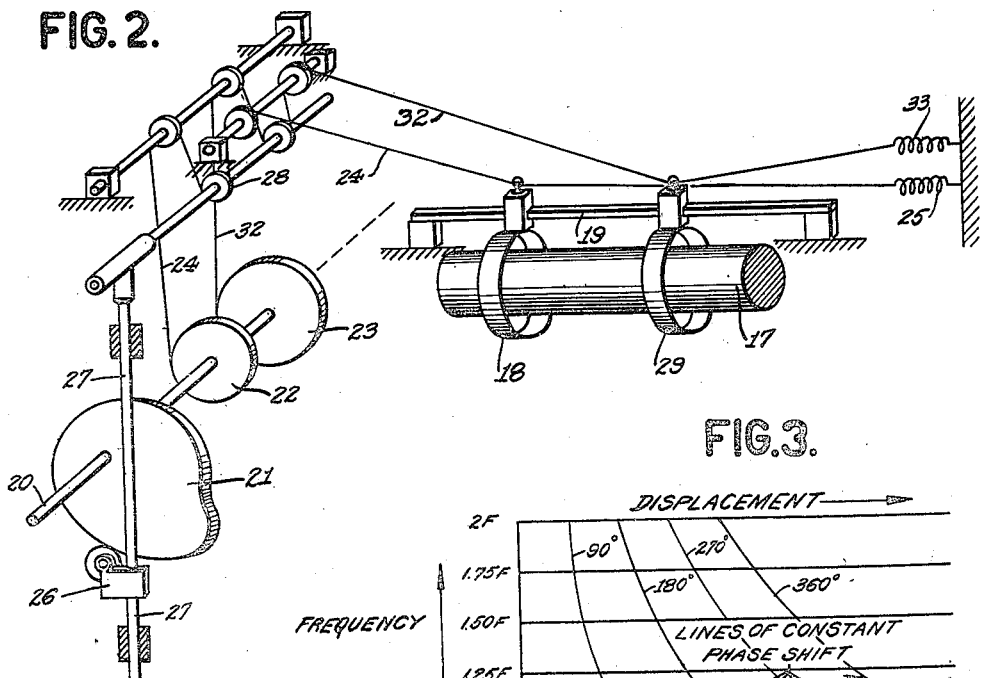
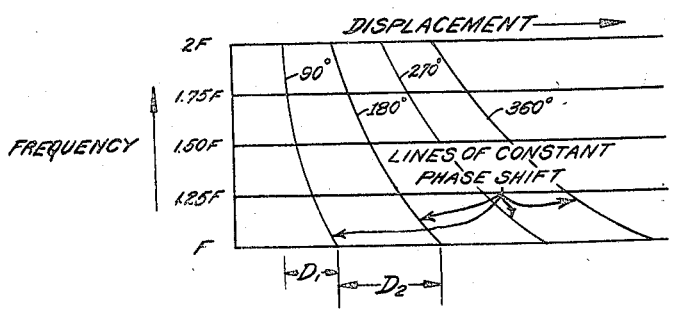
INVENTORS
HENRI G. BUSIGNIES
AVERY G. RICHARDSON
BY
ATTORNEY Patented Mar. 9, 1943

2,313,047

UNITED STATES PATENT OFFICE 2,313,047

DIRECTION FINDING SYSTEM

Henri G. Busignies, Forest Hills, N. Y., and Avery G. Richardson, Boonton, N. J., assignors to Federal Telephone & Radio Corporation, Newark, N. J., a corporation of Delaware Application August 1, 1941, Serial No. 404,998

4 Claims. (Cl. 250—11)

Our invention relates to improvements in radio direction finders, and particularly to that type of direction finder which employs additional antenna means for indicating the sense of the direction determined.

It is an object of the invention to provide a direction finder of extreme accuracy at any one of a plurality of frequencies within a rather large band.

Another object is to provide means for compensating for unbalancing of phase and amplitude relations in direction finding antennae due to field distortion, mechanical inequalities, or weather conditions or different electrical characteristics of the antennae and circuits used.

A further object is to provide improved means for combining voltages induced in a loop antenna with those picked up by a sense antenna for obtaining accurate directional sense indications.

Other objects and various further features of novelty and invention will hereinafter be pointed out or will become apparent from a reading of the following specification in conjunction with the drawing included herewith. In said drawing:

Fig. 1 is a schematic circuit diagram of a direction finder circuit in accordance with the invention;

Fig. 2 shows a schematic perspective view of an embodiment of a portion of the apparatus of Fig. 1; and Fig. 3 is a graphical showing of characteristics of portions of the circuit of Fig. 1.

It is well known that a rotatable loop antenna may be used for direction finding purposes and also that this type of antenna is incapable of itself to discriminate between two senses 180° apart. Accordingly, the familiar 180° course or direction ambiguity results. It has been found that this 180° ambiguity may be eliminated by employing additionally a non-directive type antenna and superimposing energy picked up thereby upon energy received by the loop antenna.

However, the addition of the non-directive or sense antenna does not of itself seem to solve all the problems connected with highly accurate radio goniometry. Since the voltages received by the directional or loop antenna are 90° out of phase with those induced in the sense antenna, phase shifting means are necessary to condition both these induced voltages for superposition.

Furthermore, the use of several antennae and associated circuits of different electrical characteristics has been found to give rise to detrimental phase shifts relative to each other over a frequency band. This effect, together with small loop antennae unbalance, causes a small voltage to appear in the loop antenna out of phase with the desired and normally received energy. Such a voltage necessarily causes a blurring of the minimum, thereby increasing the difficulty of taking bearings and reducing accuracy. To neutralize the undesired voltage a balancing voltage 90° out of phase with the desired voltage in the loop must be supplied. This balancing voltage may be obtained directly from the sense antenna (since it receives energy 90° out of phase with the loop antenna), from a separate source appropriately phased, or from the loop antenna itself (with appropriate phase correction, of course).

In actual practice it is relatively difficult to perform either or both of the above-indicated compensation functions. This difficulty will be apparent from an appreciation of the obviously different characteristics of loop and sense antennae. If an Adcock spaced antenna unit is employed instead of a loop, the goniometer circuits associated therewith involve such different impedance and other characteristics as further to complicate performance of the compensating functions. In addition there are difficulties encountered in the design of a phase shifting circuit which will give a constant shift and at the same time keep relative phase transmission constant for any frequency within a rather large band.

Accordingly, the invention proposes novel means for ameliorating these problems. A preferred embodiment of such means is included schematically in Fig. 1. This drawing shows direction finder equipment including direction-sensitive antenna means 10 and non-directional or sense antenna means 11. In the form shown antenna means 10 comprises a loop rotatable about a generally vertical axis 12. In a known manner, energy received by loop 10 is relayed to a receiver 13, and detected output energy is then fed to appropriate indicating means 14.

Energy received by sense antenna 11 may be treated and superimposed upon that received by loop 10 in substantially the following manner: Sense energy is first detected by a tuning circuit 15, which may form a part of receiver 13 and have adjustable elements ganged to those of the receiver. Such received energy may then be amplified by a tube 16 and, in accordance with the invention, is then supplied to an artificial line 17. Preferably, line 17 has low impedance characteristics and is so wound or otherwise constructed that it longitudinally progressively shifts the phase of input energy a half, or even a full, wave length.

Sense energy for direct superposition upon that received by loop 10 may be derived by induction from line 17 by coil means 18. It is contemplated that there will be relatively little inductive linkage between coil 18 and line 17 so that coil 18 will not draw so much energy from the line as substantially to affect the progressive phase shifting character of the latter. Coil 18 is preferably slidable longitudinally of line 17 to permit appropriate phase shifting adjustment of sense voltage for a particular frequency before superposition upon the loop voltage.

Since, for a given displacement of coil 18, the phase shift caused by the transmission line varies with the frequency of the received signal, coil 18 must be displaced along the line in order to preserve a constant phase shift of sense energy with respect to loop energy over a frequency band. This displacement may be accomplished automatically by means coupled to, say the shaft operating the receiver tuning condensers. A schematic arrangement of such a mechanical device is shown in Fig. 2, in which coil 18 will be recognized as slidably disposed with respect to line 17 along a guide rail 19.

In Fig. 2 a rotatable shaft 20 is coupled to the tuning condenser shaft (not shown) as above indicated and drives cam means 21 and a pair of drums 22, 23. Drum 22 bears a line 24 which is secured thereto at one end and at the other to coil 18. If desired, and preferably, spring or other tensioning means 25 may be provided securely to retain coil 18 at any particular position along the length of line 17. It is clear that with the apparatus thus far described coil 18 is given a translatory motion as the receiver is tuned to a particular signal frequency and that a corresponding phase shift results.

However, it has been found that the relationship between such displacement and frequency for constant phase shift is not necessarily linear. This fact is clearly shown in the graphical representation of these quantities in Fig. 3. It will be seen, for example, that for a constant phase shift of 90° in a range of frequencies F to 2F, the necessary displacement of coil 18 is much less than it would be for a constant phase shift of 180°, and so on. Accordingly, we provide additional means to account for this non-linearity. In the form shown this means comprises an additional control as to the displacement of line 24. A cam follower 26 rides cam 21 and imparts displacement motion to a sliding bar 27. Bar 27 rigidly displaces idler pulley 28, which in turn engages line 24. By proper design of cam 21 and choice of diameter of drum 22, appropriate desired motion may be imparted to coil 18, as will be clear. It thus appears that automatic compensation of phase between the sense and loop antennae may be made as the receiver is being tuned.

It was shown above that unwanted phase variations may occur between the voltage induced in the loop and that induced in the sense antenna, and that to neutralize these unwanted effects a voltage 90° out of phase with that induced in the loop is required. It is proposed in accordance with the invention that another coil 29 similar to coil 18, be slidably disposed along line 17 in order to perform the balancing function at the correct phase. As in the case of coil 18, energy induced in coil 29 is relayed for superposition upon loop energy. Control means 30 may be provided in the case of coil 29 in order to vary the magnitude of the balancing voltage as required to neutralize the undesired parasitic voltage effects.

The displacement of coil 29 may be controlled in a manner similar to that of coil 18. To this end, a drum 23 winds a line 32 in accordance with rotary movement of the gang of tuning condensers in the receiver. Line 32 is fixed to coil 29, and the latter is held firmly in place by resilient retaining means 33. Since the phase shift which must be kept constant for coil 29 is greater than for coil 18, corresponding displacements of these coils will be greater for coil 29 (see Fig. 3). Accordingly, drum 23 should be made larger than drum 22, and cam 21 may still serve to effect the appropriate compensation for non-linearity, as will be clear.

In accordance with common practice the device shown in Fig. 1 is intended for separate operation in the determination of directivity or sense. Accordingly, we provide switching means 31 for alternately feeding receiver 13 with properly compensated signal energy for directivity determination and compensated energy for sense determination. In the form shown switch means 31 is double-pole double-throw and alternately connects coil 18 or coil 29 to the loop antenna. In some cases, relay means may prove desirable for performing the switching function, as will be clear.

While the coils 18 and 29 have been shown as directly connected to the loop antenna, which in turn directly feeds receiver 13, it is to be understood that in certain cases other forms of coupling will be found preferable. For example, energy from either of coils 18 or 29 may be inductively coupled to the coil of the radio frequency tank circuit of the receiver in a known manner. Loop energy may, of course, be fed by a similar coupling to the receiver.

It is clear that we have described a relatively simple structure for automatically setting direction finding apparatus to be critically accurate and sensitive at any frequency within a large band. Moreover, it is to be understood that, while the invention has been described in detail in connection with a preferred form, various modifications, additions, and omissions may be made within its scope.

What is claimed is:

1. In a radio direction finder system comprising directionally discriminating receiving antenna means coupled to a receiver and non-directional responsive receiving antenna means, means feeding energy received by said non-directional antenna means to said receiver, said feeding means comprising an artificial transmission line having phase displacement characteristics progressing longitudinally thereof, a first coil inductively coupled to said artificial line and longitudinally displaceable therealong, a second coil inductively coupled to said artificial line and longitudinally displaceable therealong, means for feeding energy from said first coil to said receiver 90° out of phase with energy received by said directional antenna means, and means for feeding energy from said second coil to said receiver in phase with energy received by said directional antenna means.

2. A radio direction finder system comprising a receiver including tuning means, directionally discriminating receiving antenna means coupled to said receiver, non-directionally responsive receiving antenna means, and means feeding energy received by said non-directional antenna means to said receiver, said feeding means including an artificial transmission line having phase displacement characteristics progressing longitudinally thereof, coil means inductively coupled to said transmission line, and means coupling said tuning means and said coil means and displacing said coil means longitudinally of said transmission line in accordance with adjustment of said tuning means.

3. A direction finder according to claim 2, in which said coil means includes a first coil feeding energy to receiver in quadrature with that received by said directional antenna means, and a second coil feeding energy to said receiver in phase with that received by said directional antenna means, and switching means alternately supplying energy induced in said first coil and in said second coil to said receiver.

4. A direction finder according to claim 2, in which said coupling means includes cam means rotated by said tuning means, cam follower means, and means connecting said cam follower means and said coil means.

HENRI G. BUSIGNIES.
AVERY G. RICHARDSON.